US012700791B2

(12) United States Patent
Lawrence et al.

(10) Patent No.: US 12,700,791 B2
(45) Date of Patent: Aug. 4, 2026

(54) FLYING CAPACITOR VOLTAGE AND INDUCTOR CURRENT COMPENSATION FOR NONLINEAR COUPLING IN A THREE-LEVEL CONVERTER

(71) Applicant: Cirrus Logic International Semiconductor Ltd., Edinburgh (GB)

(72) Inventors: Jason W. Lawrence, Austin, TX (US); Graeme G. Mackay, Austin, TX (US); Hasnain Akram, Austin, TX (US); Ilija Jergovic, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 128 days.

(21) Appl. No.: 18/618,267

(22) Filed: Mar. 27, 2024

(65) Prior Publication Data

US 2025/0253758 A1 Aug. 7, 2025

Related U.S. Application Data

(60) Provisional application No. 63/548,684, filed on Feb. 1, 2024, provisional application No. 63/548,677, filed on Feb. 1, 2024.

(51) Int. Cl.
*H02M 3/07* (2006.01)
*H02M 1/00* (2006.01)
*H02M 3/158* (2006.01)

(52) U.S. Cl.
CPC ........... *H02M 1/0095* (2021.05); *H02M 3/07* (2013.01); *H02M 3/158* (2013.01)

(58) Field of Classification Search
CPC .............................................. H02M 3/07–078
See application file for complete search history.

(56) References Cited

U.S. PATENT DOCUMENTS 9,866,113 B1 1/2018 Assaad
10,554,124 B1 2/2020 Mangudi et al.
11,356,021 B2 6/2022 Kim
(Continued)

OTHER PUBLICATIONS

Z. Ye, Y. Lei, Z. Liao and R. C. N. Pilawa-Podgurski, "Investigation of Capacitor Voltage Balancing in Practical Implementations of Flying Capacitor Multilevel Converters," in IEEE Transactions on Power Electronics, vol. 37, No. 3, pp. 2921-2935, Mar. 2022 (Year: 2022).*

(Continued)

*Primary Examiner* — Peter M Novak
(74) *Attorney, Agent, or Firm* — Jackson Walker L.L.P.

(57) ABSTRACT

A system may include a power inductor electrically coupled to the plurality of switches, and a flying capacitor coupled to the plurality of switches, wherein the plurality of switches are controllable among a plurality of switch configurations in order to generate an output voltage from an input voltage received by the multi-level power converter. The system may also include a flying capacitor voltage control loop configured to, based on an error signal between a measurement of a flying capacitor voltage across terminals of the flying capacitor and a flying capacitor reference voltage, generate switch control signals for switching among the plurality of switch configurations in order to regulate the flying capacitor voltage and a compensator configured to apply compensation to the flying capacitor reference voltage based on a measurement of the input voltage.

8 Claims, 8 Drawing Sheets

300

(56) References Cited

U.S. PATENT DOCUMENTS

| | | | | |
|---|---|---|---|---|
| 2012/0038337 A1* | 2/2012 | Buiatti | .................... | H02M 1/34 |
| | | | | 323/282 |
| 2020/0195133 A1* | 6/2020 | Bonnano | ............... | H02M 3/158 |
| 2021/0203223 A1 | 7/2021 | Chang | | |
| 2022/0231618 A1 | 7/2022 | Yan et al. | | |
| 2022/0393578 A1 | 12/2022 | Ye et al. | | |
| 2023/0412090 A1* | 12/2023 | Abdelhamid | ....... | H02M 1/0025 |
| 2025/0119063 A1 | 4/2025 | Wu et al. | | |
| 2025/0141366 A1* | 5/2025 | Abdelhamid | ....... | H02M 7/5395 |
| 2025/0253770 A1 | 8/2025 | Lawrence et al. | | |
| 2026/0019008 A1* | 1/2026 | Rossi | .................. | H02M 1/0095 |

OTHER PUBLICATIONS

Search Report under Section 17, UKIPO, Application No. GB2501024. 0, dated Aug. 8, 2025.
Combined Search and Examination Report under Sections 17 and 18(3), UKIPO, Application No. GB2501023.2, dated Aug. 13, 2025.

* cited by examiner

FLYING CAPACITOR VOLTAGE AND INDUCTOR CURRENT COMPENSATION FOR NONLINEAR COUPLING IN A THREE-LEVEL CONVERTER

RELATED APPLICATION

The present disclosure claims priority to U.S. Provisional Patent Application No. 63/548,677, filed Feb. 1, 2024, and U.S. Provisional Patent Application No. 63/548,684, filed Feb. 1, 2024, both of which are incorporated by reference herein in their entireties.

FIELD OF DISCLOSURE

The present disclosure relates in general to circuits for electronic devices, including without limitation personal audio devices such as wireless telephones and media players, and more specifically, closed-loop control of power converters, including multi-level power converters.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones, one or more speakers, haptic actuators, camera stabilization motors, and/or other loads. Such circuitry often includes a driver including a power amplifier for driving an output signal to such loads. Oftentimes, a power converter may be used to provide a supply voltage to a power amplifier in order to amplify a signal driven to speakers, headphones, other transducers, or other loads. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier. A power converter may be used to provide supply voltage rails to one or more components in a device. A power converter may also be used in other applications besides driving audio transducers, such as driving haptic actuators or other electrical or electronic loads. Further, a power converter may also be used in charging a battery from a source of electrical energy (e.g., an AC-to-DC adapter).

To achieve power efficiency at light loads, power converters may be required to limit the magnitude of reverse current, as reverse current causes power loss and back-powers the power supply (e.g., battery). Limiting reverse current may be achieved using demagnetization or synchronous demagnetization with a zero-cross detector, with synchronous demagnetization typically achieving higher power efficiency. To also achieve power efficiency at light loads, power converters may also reduce switching frequency at low loads to reduce non-conduction loss terms.

A type of power converter known as a multi-level power converter (e.g., n-level power converter where n≥3) may have unique challenges at lighter loads. For example, multi-level converters may comprise one or more fly capacitors that need to be regulated within a defined range of voltage for considerations including operation within a safe operating area. However, at light loads, there may be insufficient current available to actively balance the one or more fly capacitors. Further, the magnetization and magnetization slopes may become shallow at multiple duty cycles using the typical continuous conduction mode sequence of the multi-level converter, such as a duty cycle of 0.5 for a 3-level converter (e.g., wherein duty cycle equals a ratio of an output voltage $V_{OUT}$ to an input voltage $V_{IN}$ for a buck mode operation of a 3-level converter). Such shallow slopes may not allow the power inductor of the power converter to demagnetize in time for the next switching pulse.

FIG. 1 illustrates selected components of an example circuit 100 for driving a load 120, as is known in the art. As shown in FIG. 1, a modulator 110 may receive one or more control parameters REF (e.g., which may be a digital signal indicative of a desired output voltage $V_{OUT}$ to be driven to load 120, a desired current $I_L$ to be driven through a power inductor of the modulator, and/or a desired flying capacitor voltage $V_{FLY}$), and based on such control parameter, generate switching control signals for controlling switches of an analog power stage 101, such as a power converter, for example. As an example, as shown in FIG. 1, modulator 110 may generate a pulse-width modulated (PWM) signal PWM1 and a PWM signal PWM2.

One type of power converter often used in electronic circuits is a 3-level power converter. FIG. 1 depicts analog power stage 101 as a 3-level power converter, as is known in the art. As shown in FIG. 1, analog power stage 101 may receive an input voltage $V_{IN}$ and have an output configured to generate an output voltage $V_{OUT}$ based on switching signals received from modulator 110. Further, analog power stage 101 may include a switching node having a voltage $L_X$. Analog power stage 101 may include a power inductor 102 coupled between the switching node and the output. Moreover, analog power stage 101 may include a flying capacitor 104 having a first capacitor terminal and a second capacitor terminal, and having flying voltage $V_{FLY}$ across its terminals. In addition, analog power stage 101 may include a plurality of switches 106a, 106b, 106c, and 106d, wherein switch 106a is coupled between the input and the first capacitor terminal, switch 106b is coupled between the first capacitor terminal and the switching node, switch 106c is coupled between the second capacitor terminal and the switching node, and switch 106d is coupled between the second capacitor terminal and a ground voltage. In operation, switches 106a, 106b, 106c, and 106d may be controlled by modulator 110 to regulate output voltage $V_{OUT}$ to a desired target voltage. For example, PWM signal PWM1 may control switches 106b and 106c such that switch 106b is activated and switch 106c is deactivated when PWM signal PWM1 is asserted and switch 106b is deactivated and switch 106c is activated when PWM signal PWM1 is deasserted. Likewise, PWM signal PWM2 may control switches 106a and 106d such that switch 106a is activated and switch 106d is deactivated when PWM signal PWM2 is asserted and switch 106a is deactivated and switch 106d is activated when PWM signal PWM2 is deasserted.

In operation, switches 106 may be controlled to regulate output voltage $V_{OUT}$ to a desired target voltage. As shown in FIGS. 2A and 2B, buck operation of analog power stage 101 may include cyclic, periodic commutation of switches 106 among a first state ($\varphi$1), a second state ($\varphi$2), a third state ($\varphi$3), and a fourth state ($\varphi$4). As shown in FIG. 2A, for duty cycles D of less than 0.5, switches 106a and 106c may be activated (and switches 106b and 106d deactivated) during the first state ($\varphi$1) in a VCS configuration, switches 106c and 106d may be activated (and switches 106a and 106b may be deactivated) during the second state ($\varphi2$) in a GS configuration, switches 106b and 106d may be activated (and switches 106a and 106c may be deactivated) during the third state ($\varphi3$) in a GCS configuration, and switches 106c and 106d may be activated (and switches 106a and 106b may be deactivated) during the fourth state ($\varphi4$) in the GS configuration.

Further, as shown in FIG. 2B, for duty cycles D of greater than 0.5, switches 106a and 106b may be activated (and switches 106c and 106d deactivated) during the first state ($\varphi1$) in a VS configuration, switches 106a and 106c may be activated (and switches 106b and 106d may be deactivated) during the second state ($\varphi2$) in the VCS configuration, switches 106a and 106b may be activated (and switches 106c and 106d may be deactivated) during the third state ($\varphi3$) in the VS configuration, and switches 106b and 106d may be activated (and switches 106a and 106c may be deactivated) during the fourth state ($\varphi4$) in the GCS configuration.

The acronyms VS, VCS, GS, and GCS stand for the path of current in each of the respective configurations, wherein "V" stands for the voltage supply, "C" stands for flying capacitor 104, "S" stands for the switching node, and "G" stands for ground voltage.

Multi-level converters such as those depicted in FIGS. 1, 2A, and 2B may have a dedicated balancing loop (not shown) for flying capacitor 104 that uses a current flowing to load 120 to regulate flying voltage $V_{FLY}$ and a dedicated control loop (not shown) for controlling current $I_L$. In many existing control topologies, control of flying voltage $V_{FLY}$ and control of current $I_L$ are assumed to be decoupled and independent due to the presence of modulator 110. However, such assumption may only be proper when a small ripple exists within current $I_L$ and flying voltage $V_{FLY}$ and when only small signal perturbations exist within current $I_L$ and flying voltage $V_{FLY}$. On the other hand, in the presence of high-bandwidth signals or large signals, nonlinear coupling may occur between current $I_L$ and flying voltage $V_{FLY}$ that may degrade performance of system 100. Accordingly, systems and methods for minimizing or eliminating the effects of such nonlinear coupling may be desired.

SUMMARY

In accordance with the teachings of the present disclosure, one or more disadvantages and problems associated with operation of multi-level converters at low load conditions may be reduced or eliminated.

In accordance with embodiments of the present disclosure, a system may include a multi-level power converter comprising a plurality of switches, a power inductor electrically coupled to the plurality of switches, and a flying capacitor coupled to the plurality of switches, wherein the plurality of switches are controllable among a plurality of switch configurations in order to generate an output voltage from an input voltage received by the multi-level power converter. The system may also include a flying capacitor voltage control loop configured to, based on an error signal between a measurement of a flying capacitor voltage across terminals of the flying capacitor and a flying capacitor reference voltage, generate switch control signals for switching among the plurality of switch configurations in order to regulate the flying capacitor voltage and a compensator configured to apply compensation to the flying capacitor voltage control loop based on a measurement of an inductor current flowing through the power inductor.

In accordance with these and other embodiments of the present disclosure, a system may include a multi-level power converter comprising a plurality of switches, a power inductor electrically coupled to the plurality of switches, and a flying capacitor coupled to the plurality of switches, wherein the plurality of switches are controllable among a plurality of switch configurations in order to generate an output voltage from an input voltage received by the multi-level power converter. The system may also include a power inductor current control loop configured to, based on an error signal between a measurement of an inductor current flowing through the power inductor and a reference inductor current, generate switch control signals for switching among the plurality of switch configurations in order to regulate the inductor current and a compensator configured to apply compensation to the power inductor current control loop based on a measurement of a flying capacitor voltage across terminals of the flying capacitor.

In accordance with these and other embodiments of the present disclosure, a system may include a multi-level power converter comprising a plurality of switches, a power inductor electrically coupled to the plurality of switches, and a flying capacitor coupled to the plurality of switches, wherein the plurality of switches are controllable among a plurality of switch configurations in order to generate an output voltage from an input voltage received by the multi-level power converter, the switch configurations comprising at least a first switch configuration and a second switch configuration. The system may also include a flying capacitor voltage control loop configured to, in order to regulate the flying capacitor voltage, sequentially and periodically apply the first switch configuration and the second switch configuration, such that an inductor current of the power inductor flows through the flying capacitor in a first direction during the first switch configuration and flows through the flying capacitor in a second direction during the second switch configuration, and dynamically modify relative durations of the first switch configuration and the second switch configuration based on the inductor current.

In accordance with these and other embodiments of the present disclosure, a method may be provided for a multi-level power converter comprising a plurality of switches, a power inductor electrically coupled to the plurality of switches, and a flying capacitor coupled to the plurality of switches, wherein the plurality of switches are controllable among a plurality of switch configurations in order to generate an output voltage from an input voltage received by the multi-level power converter. The method may include generating, based on an error signal between a measurement of a flying capacitor voltage across terminals of the flying capacitor and a flying capacitor reference voltage, switch control signals for switching among the plurality of switch configurations in order to regulate the flying capacitor voltage. The method may also include applying compensation to the flying capacitor voltage control loop based on a measurement of an inductor current flowing through the power inductor.

In accordance with these and other embodiments of the present disclosure, a method may be provided for a multi-level power converter comprising a plurality of switches, a power inductor electrically coupled to the plurality of switches, and a flying capacitor coupled to the plurality of switches, wherein the plurality of switches are controllable among a plurality of switch configurations in order to generate an output voltage from an input voltage received by the multi-level power converter. The method may include, based on an error signal between a measurement of an inductor current flowing through the power inductor and a reference inductor current, generating switch control signals for switching among the plurality of switch configurations in order to regulate the inductor current. The method may also include applying compensation to the power inductor current control loop based on a measurement of a flying capacitor voltage across terminals of the flying capacitor.

In accordance with these and other embodiments of the present disclosure, a method may be provided for a multi-level power converter comprising a plurality of switches, a power inductor electrically coupled to the plurality of switches, and a flying capacitor coupled to the plurality of switches, wherein the plurality of switches are controllable among a plurality of switch configurations in order to generate an output voltage from an input voltage received by the multi-level power converter. The method may include, in order to regulate the flying capacitor voltage, sequentially and periodically applying the first switch configuration and the second switch configuration, such that an inductor current of the power inductor flows through the flying capacitor in a first direction during the first switch configuration and flows through the flying capacitor in a second direction during the second switch configuration, and dynamically modifying relative durations of the first switch configuration and the second switch configuration based on the inductor current.

In accordance with these and other embodiments of the present disclosure, a system may include a multi-level power converter comprising a plurality of switches, a power inductor electrically coupled to the plurality of switches, and a flying capacitor coupled to the plurality of switches, wherein the plurality of switches are controllable among a plurality of switch configurations in order to generate an output voltage from an input voltage received by the multi-level power converter. The system may also include a flying capacitor voltage control loop configured to, based on an error signal between a measurement of a flying capacitor voltage across terminals of the flying capacitor and a flying capacitor reference voltage, generate switch control signals for switching among the plurality of switch configurations in order to regulate the flying capacitor voltage and a compensator configured to apply compensation to the flying capacitor reference voltage based on a measurement of the input voltage.

In accordance with these and other embodiments of the present disclosure, a method may be provided for a multi-level power converter comprising a plurality of switches, a power inductor electrically coupled to the plurality of switches, and a flying capacitor coupled to the plurality of switches, wherein the plurality of switches are controllable among a plurality of switch configurations in order to generate an output voltage from an input voltage received by the multi-level power converter. The method may include, based on an error signal between a measurement of a flying capacitor voltage across terminals of the flying capacitor and a flying capacitor reference voltage, generating switch control signals for switching among the plurality of switch configurations in order to regulate the flying capacitor voltage. The method may also include applying compensation to the flying capacitor reference voltage based on a measurement of the input voltage.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 3:
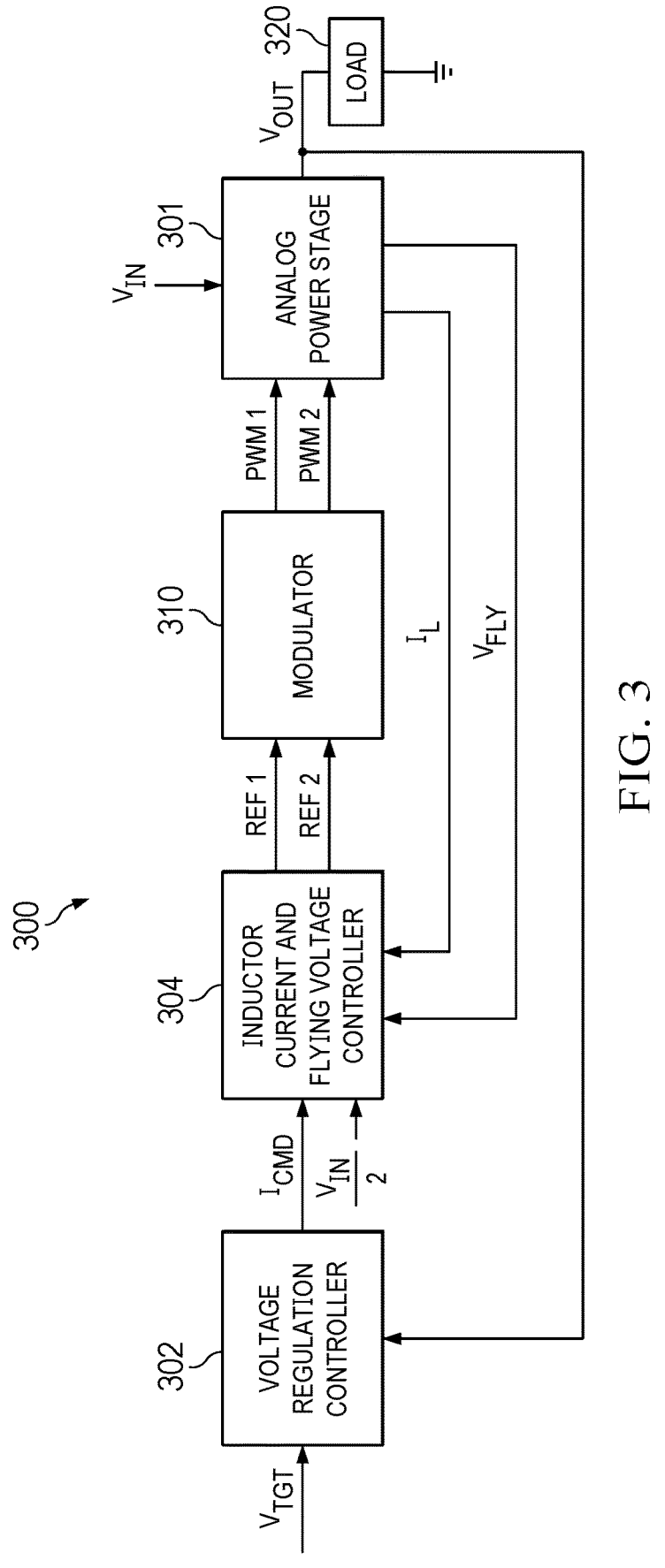
FIG. 3 illustrates a block diagram of selected components of an example system for driving a load using a switched analog power stage, in accordance with embodiments of the present disclosure.

FIG. 3 illustrates a block diagram of selected components of an example system 300 for driving a load 320 using a switched analog power stage 301, in accordance with embodiments of the present disclosure. As shown in FIG. 3, system 300 may include analog power stage 301, voltage regulation controller 302, inductor current and flying voltage controller 304, modulator 310, and load 320.

Analog power stage 301 may comprise any suitable system, device, or apparatus configured to drive a power inductor current $I_L$ and a voltage $V_{OUT}$ from a supply voltage $V_{IN}$ based on switch control signals provided from modulator 310. In some embodiments, analog power stage 301 may comprise an inductive- and/or capacitive-based power converter. In particular embodiments, analog power stage 301 may comprise a multi-level power converter identical or similar to that discussed in the Background section of this application.

Voltage regulation controller 302 may comprise any system, device, or apparatus configured to implement a control loop to regulate voltage $V_{OUT}$ to track a target voltage $V_{TGT}$. For example, based on an error between target voltage $V_{TGT}$ and a measurement of voltage $V_{OUT}$, voltage regulation controller 302 may generate a commanded current $I_{CMD}$, which serves as a target setpoint current value for power inductor current $I_L$ flowing within analog power stage 301 in order to regulate voltage $V_{OUT}$ to target voltage $V_{TGT}$.

Inductor current and flying voltage controller 304 may comprise any system, device, or apparatus configured to, based on commanded current $I_{CMD}$ and a value equal to one half of supply voltage $V_{IN}$, generate two reference signals REF1 and REF2 for modulator 310.

Modulator 310 may comprise any suitable system, device, or apparatus configured to receive reference signals REF1 and REF2, and generate switching signals PWM1 and PWM2 for controlling switching of switches integral to analog power stage 301, as discussed in greater detail below. In some embodiments, modulator 310 may comprise a pulse-width modulator.

Figure 1:
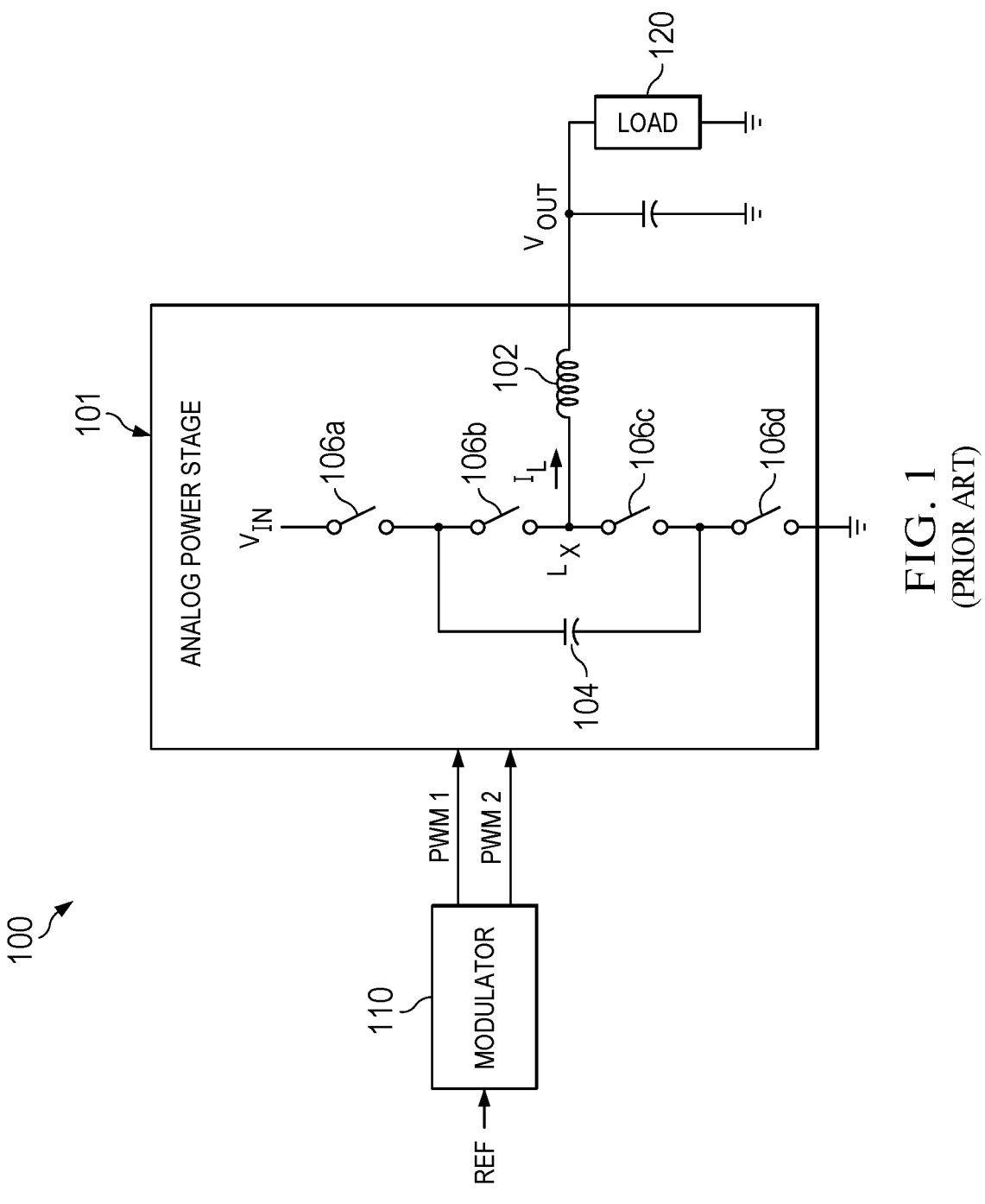
FIG. 1 illustrates a circuit diagram of selected components of an example circuit for driving a load using a 3-level power converter, as is known in the art.

If analog power stage 301 is identical to similar analog power stage 101 of FIG. 1, and is operating in a buck mode of operation, PWM signal PWM1 may control switches 106*b* and 106*c* such that switch 106*b* is activated and switch 106*c* is deactivated when PWM signal PWM1 is asserted and switch 106*b* is deactivated and switch 106*c* is activated when PWM signal PWM1 is deasserted. Likewise, PWM signal PWM2 may control switches 106*a* and 106*d* such that switch 106*a* is activated and switch 106*d* is deactivated when PWM signal PWM2 is asserted and switch 106*a* is deactivated and switch 106*d* is activated when PWM signal PWM2 is deasserted.

Load 320 may include any appropriate electrical or electronic load that may be powered from analog power stage 301, including without limitation a rechargeable battery.

Figure 4:
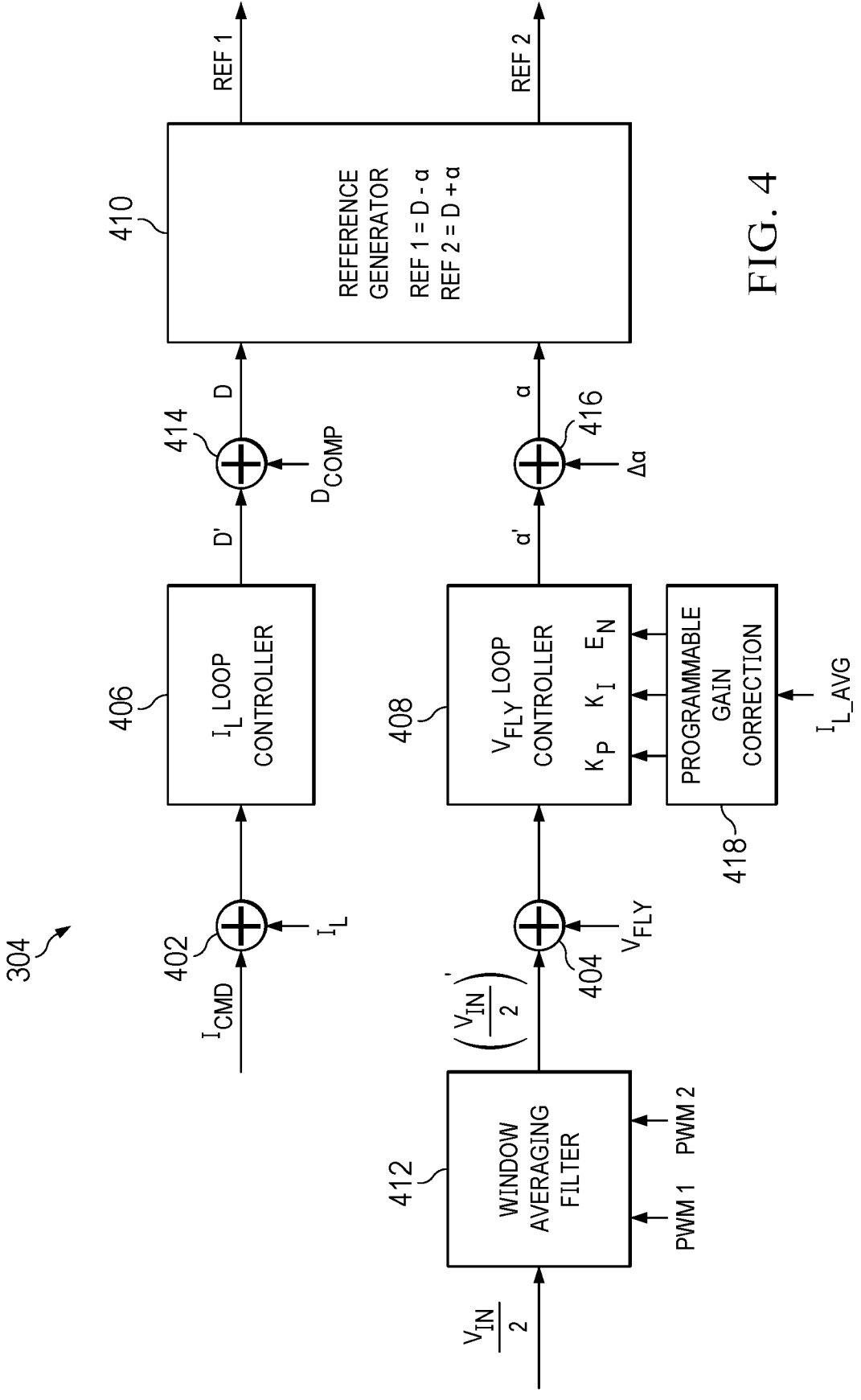
FIG. 4 illustrates a block diagram of selected components of an example inductor current and flying voltage controller, in accordance with embodiments of the present disclosure.

FIG. 4 illustrates a block diagram of selected components of an example inductor current and flying voltage controller 304, in accordance with embodiments of the present disclosure. As shown in FIG. 4, inductor current and flying voltage controller 304 may have an inductor current control loop for controlling power inductor current $I_L$ and a flying capacitor voltage control loop for controlling flying capacitor voltage $V_{FLY}$. The inductor current control loop may include an error summer 402 and an $I_L$ loop controller 406. Error summer 402 may generate an error signal based on the difference between commanded current $I_{CMD}$ and power inductor current $I_L$. $I_L$ loop controller 406 may generate a duty cycle signal D based on the error signal, increasing duty cycle signal D when power inductor current $I_L$ is below commanded current $I_{CMD}$ and decreasing duty cycle signal D when power inductor current $I_L$ is above commanded current $I_{CMD}$. In some embodiments, $I_L$ loop controller 406 may comprise a proportional-integral (PI) controller.

Similarly, the flying capacitor voltage control loop may include an error summer 404 and a $V_{FLY}$ loop controller 408. Error summer 404 may generate an error signal based on the difference between the one-half of input voltage $V_{IN}$ (e.g., $V_{IN}/2$) and flying voltage $V_{FLY}$. $V_{FLY}$ loop controller 408 may generate an offset signal α based on the error signal, increasing offset signal α when flying capacitor voltage $V_{FLY}$ is below commanded current $V_{FLY}/2$ and decreasing offset signal α when flying capacitor voltage $V_{FLY}$ is above $V_{FLY}/2$. In some embodiments, $V_{FLY}$ loop controller 408 may comprise a proportional-integral (PI) controller.

As further shown in FIG. 4, inductor current and flying voltage controller 304 may include a reference generator 410. Reference generator 410 may include any system, device, or apparatus configured to generate reference signals REF1 and REF2 from duty cycle signal D and offset signal α. For example, as shown in FIG. 4, reference signal REF1 may be defined by REF1=D−α while reference signal REF2 may be defined by REF2=D+α. So, duty cycle signal D may be thought of as an average or common mode of reference signals REF1 and REF2, while offset signal α is an offset of reference signals REF1 and REF2 from such average or common mode.

Figure 5A:
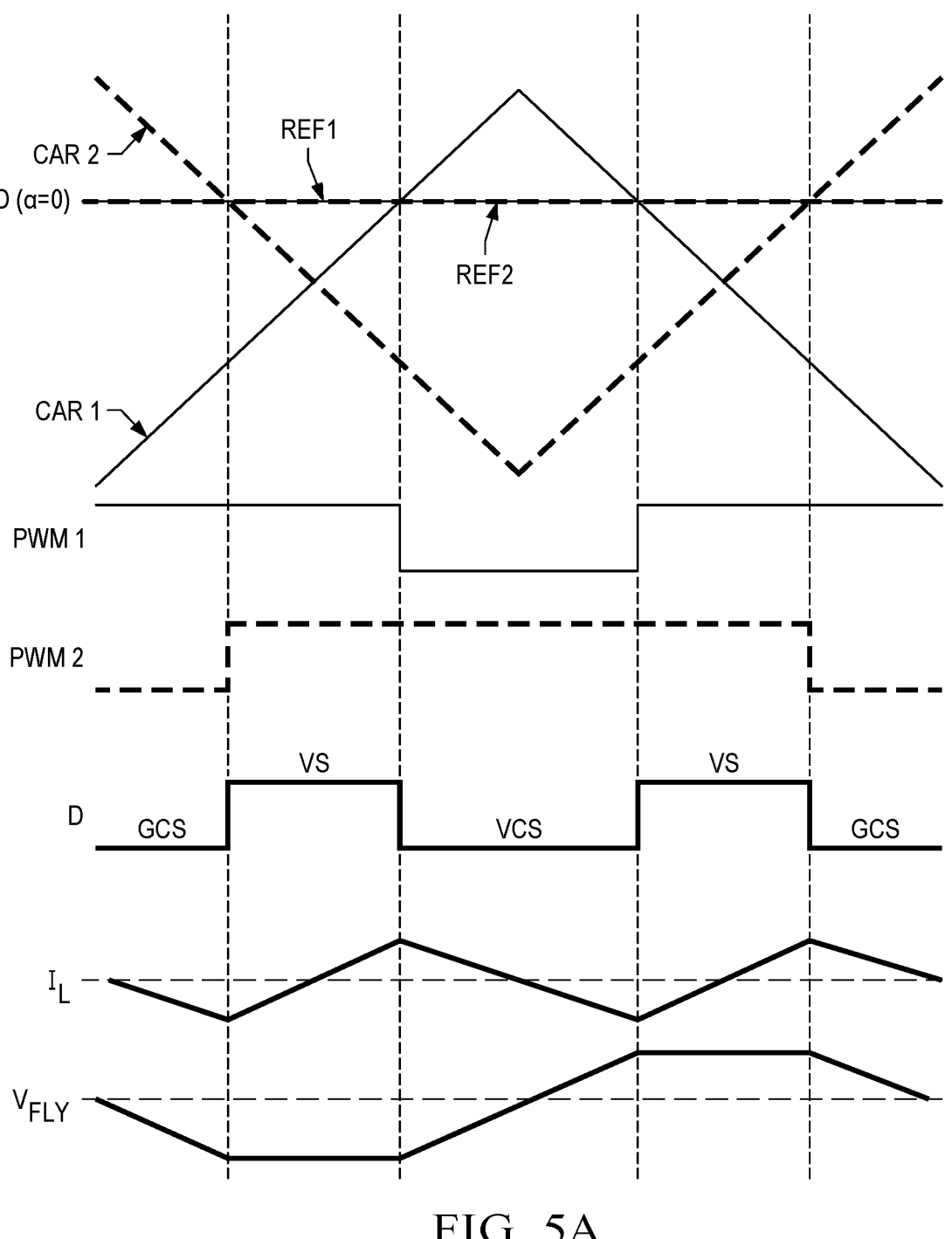
FIGS. 5A-5C illustrate generation of reference signals REF1 and REF2, in accordance with embodiments of the present disclosure.

Generation of reference signals REF1 and REF2 may be further illustrated by reference to FIGS. 5A-5C. FIG. 5A depicts nominal waveforms of reference signals REF1, REF2, triangle wave carrier signals CAR1 and CAR2 of modulator 310, switching control signals PWM1 and PWM2, duty cycle D for power inductor current $I_L$, power inductor current $I_L$, and flying capacitor voltage $V_{FLY}$. The waveforms shown in FIG. 5A are for buck mode operation (e.g., $V_{OUT}>V_{IN}/2$) and for duty cycles of power inductor current $I_L$ greater than 0.5 (e.g., switching sequence of FIG. 2B). However, similar concepts and techniques may apply to other modes of operation and to buck mode operation for duty cycles of power inductor current $I_L$ lesser than 0.5 (e.g., switching sequence of FIG. 2A).

As shown in FIG. 5A, switching signal PWM1 may comprise a PWM signal generated by comparing reference signal REF to a first triangular carrier wave CAR1, such that switching signal PWM1 is asserted when reference signal REF1 exceeds first triangular carrier wave CAR1 and is deasserted when reference signal REF1 is less than first triangular carrier wave CAR1. Similarly, switching signal PWM2 may comprise a PWM signal generated by comparing reference signal REF2 to a second triangular carrier wave CAR2, wherein second triangular carrier wave CAR2 may be the opposite of first triangular carrier wave CAR1, such that switching signal PWM2 is asserted when reference signal REF2 exceeds second triangular carrier wave CAR2 and is deasserted when reference signal REF2 is less than second triangular carrier wave CAR2.

Figure 5B:
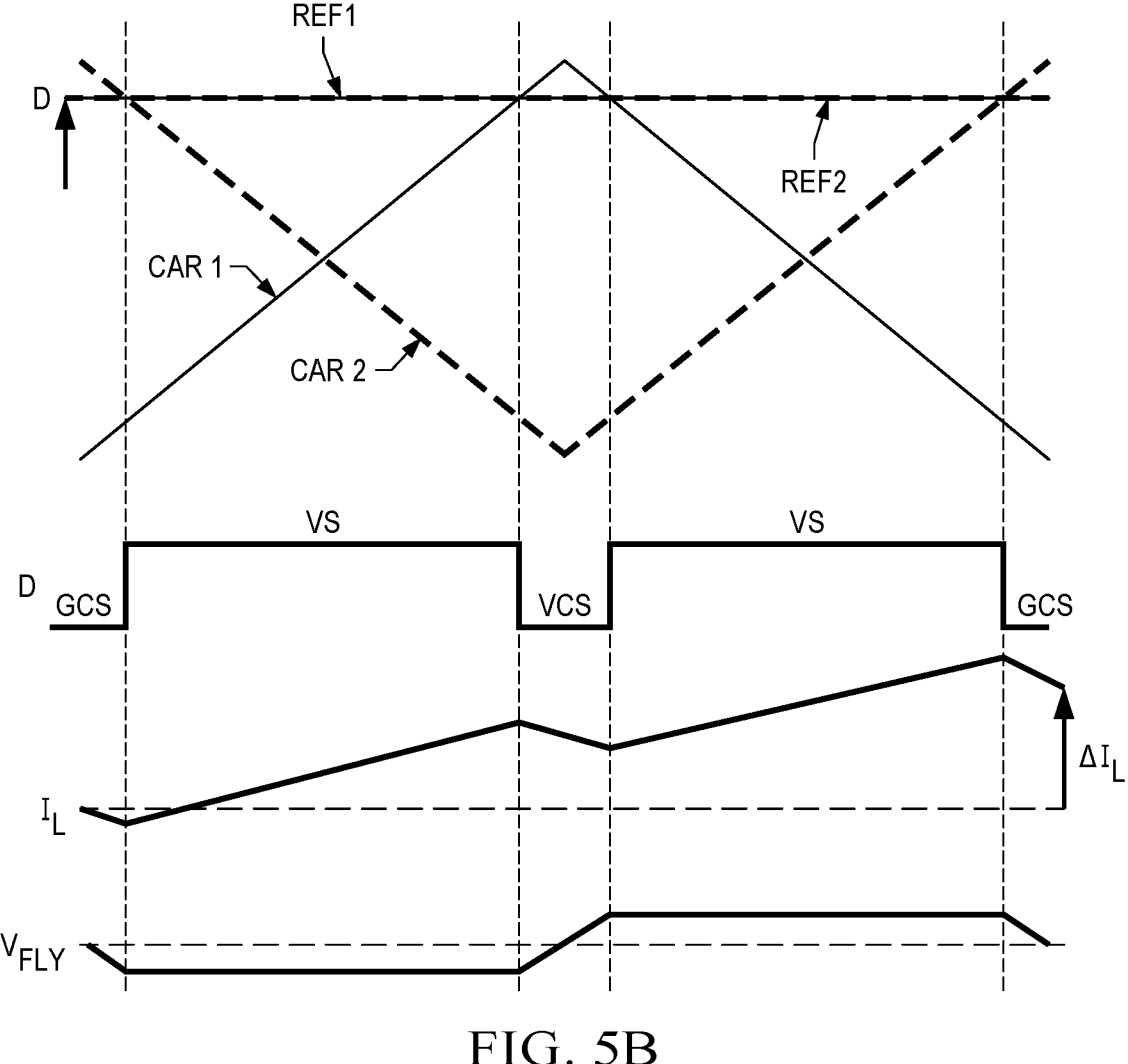

As shown in FIG. 5B, to increase power inductor current $I_L$ by an amount $\Delta I_L$, $I_L$ loop controller 406 may increase duty cycle signal D, which may in turn increase reference signals REF1 and REF2, increasing the time analog power stage 301 is in the VS configuration and decreasing the time analog power stage 301 is in the VCS and GCS configurations. Similarly, to decrease power inductor current $I_L$, $I_L$ loop controller 406 may decrease duty cycle signal D, which may in turn decrease reference signals REF1 and REF2, decreasing the time analog power stage 301 is in the VS configuration and increasing the time analog power stage 301 is in the VCS and GCS configurations.

Figure 5C:
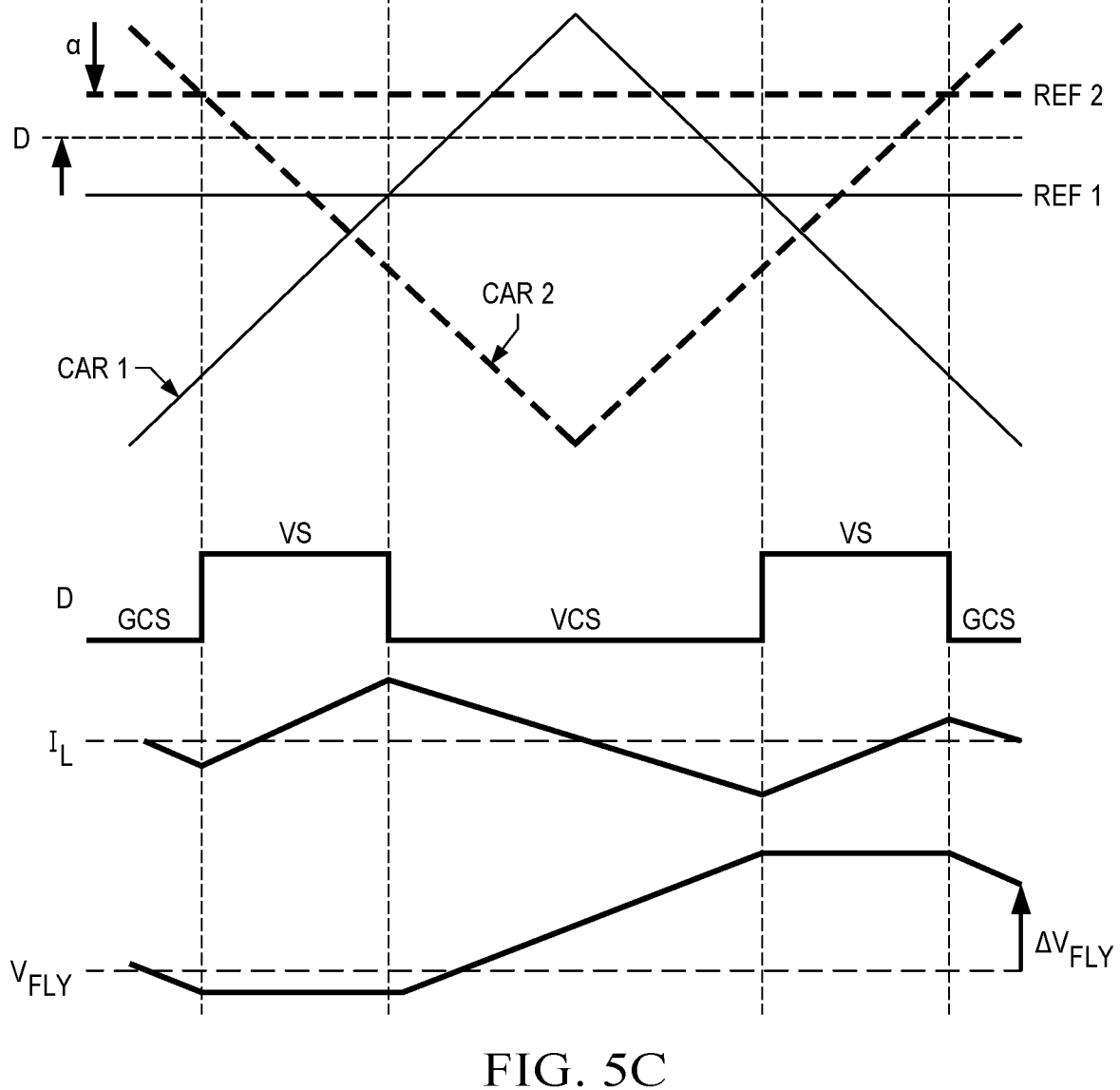

As shown in FIG. 5C, to increase flying capacitor voltage $V_{FLY}$ by an amount $\Delta V_{FLY}$, $V_{FLY}$ loop controller 408 may increase offset signal α, which may in turn increase reference signal REF2 while decreasing reference signal REF1, increasing the time analog power stage 301 is in the VCS configuration and decreasing the time analog power stage 301 is in the GCS configuration. Similarly, to decrease flying capacitor voltage $V_{FLY}$, $V_{FLY}$ loop controller 408 may decrease offset signal α, which may in turn decrease reference signal REF2 while increasing reference signal REF1, decreasing the time analog power stage 301 is in the VCS configuration and increasing the time analog power stage 301 is in the GCS configuration.

For the purposes of clarity and exposition, the foregoing description of operation of inductor current and flying voltage controller 304 has ignored compensation terms applied to loop control, which are described in greater detail below. Such compensation terms may be required to correct for non-linear coupling between power inductor current $I_L$ and flying capacitor voltage $V_{FLY}$ that may result from high bandwidth and large signals and result in performance degradation.

Turning again to FIG. 4, one compensation for non-linearity may correct for non-linear effects to offset signal α which may result from a commanded change $\Delta I_{CMD}$ to commanded current $I_{CMD}$. Such correction may be performed by summer 416, which adds an alpha compensation Δα to a raw offset signal α' generated by $V_{FLY}$ loop controller 408, to generate a compensated offset signal α received by reference generator 410.

To illustrate calculation of alpha compensation Δα, it is noted that commanded change $\Delta I_{CMD}$ may be given by:

$$\Delta I_{CMD} = \frac{T}{2L} V_{IN} \Delta D$$

where T is equal to the reciprocal of the switching frequency of analog power stage 301, L equals an inductance of a power inductor (e.g., power inductor 102) through which power inductor current $I_L$ flows, and $\Delta D$ equals a change in duty cycle D for inductor current $I_L$. Given such commanded change $\Delta I_{CMD}$, alpha compensation $\Delta\alpha$ may be calculated using the quadratic formula as:

$$\Delta\alpha = \frac{-b + \sqrt{b^2 - 4ac}}{2a}$$

wherein the values a, b, and c are given by:

$$a =$$

$$(s)\left[\frac{T\left(V_{OUT} - \frac{V_{IN}}{2}\right)}{2L}\right] \text{ and } \begin{cases} s = 1 & \text{if } CAR1 \text{ rising and } CAR2 \text{ falling} \\ s = -1 & \text{if } CAR2 \text{ rising and } CAR2 \text{ falling} \end{cases}$$

$$b = I_{CMD} + I_{INIT}$$

$$c = (s)\left[\tilde{D}\left(I_{CMD} - I_{INIT} + \frac{T\left(V_{OUT} - \frac{V_{IN}}{2}\right)}{2L}\right)\left(\tilde{D}^2 - D_0^2\right)\right]$$

where $I_{INIT}$ represents the value of commanded current $I_{CMD}$ prior to commanded change $\Delta I$, $\tilde{D} = \lfloor 2D - 1 \rfloor$, and $D_0$ equals the initial value for duty cycle D prior to commanded change $\Delta I$.

In some embodiments, to simplify the complexity of the solution of alpha compensation $\Delta\alpha$ to linear instead of a quadratic function, alpha compensation $\Delta\alpha$ may be given by:

$$\Delta\alpha = \frac{-c}{b}$$

Another compensation for non-linearity may correct for non-linear effects to offset signal $\alpha$ that may occur for lower values of power inductor current $I_L$. For sufficiently high values of power inductor current $I_L$, the change $\Delta V_{FLY}$ in flying capacitor voltage $V_{FLY}$ per switching cycle of analog power stage 310 may be approximated by:

$$\Delta V_{FLY} \approx \left(2 I_{L\_AVG} \frac{T}{C_{FLY}}\right)\alpha$$

where $I_{L\_AVG}$ is the average value of power inductor current $I_L$ and $C_{FLY}$ is the capacitance of the flying capacitor of analog power stage 301. However, when power inductor current $I_L$ is low (e.g., near zero), change $\Delta V_{FLY}$ may no longer be linearly related to offset signal $\alpha$, with the non-linearity becoming worse as power inductor current $I_L$ continues to decrease.

In order to correct for this nonlinearity, inductor current and flying voltage controller 304 may include a programmable gain correction block 418 configured to control controller gains (e.g., proportional gain $K_P$ and integral gain $K_I$) of $V_{FLY}$ loop controller 408 based on average power inductor current $I_{L\_AVG}$. In addition, programmable gain correction block 418 may also be configured to selectively enable and disable $V_{FLY}$ loop controller 408 (e.g., such that the raw offset signal $\alpha'$ generated by $V_{FLY}$ loop controller 408 is zero during periods of time in which $V_{FLY}$ loop controller 408 is disabled).

For example, for values of power inductor current $I_{L\_AVG}$ below a first threshold (e.g., 0.5 A), severe nonlinearities between change $\Delta V_{FLY}$ and offset signal $\alpha$ may be expected, and thus programmable gain correction block 418 may disable alpha control of flying capacitor voltage $V_{FLY}$. As another example, for values of power inductor current $I_{L\_AVG}$ above the first threshold but below a second threshold (e.g., 2.0 A), some nonlinearities between change $\Delta V_{FLY}$ and offset signal $\alpha$ may be expected, and thus programmable gain correction block 418 may (e.g., based on a formula or values set forth in a lookup table) set gain values of inductor current and flying voltage controller 304 (e.g., proportional gain $K_P$ and integral gain $K_I$) as a function of power inductor current $I_{L\_AVG}$. As a further example, for values of power inductor current $I_{L\_AVG}$ above the second threshold, fewer nonlinearities may be present, and thus programmable gain correction block 418 may (e.g., based on a formula or values set forth in a lookup table) set gain values of inductor current and flying voltage controller 304 (e.g., proportional gain $K_P$ and integral gain $K_I$) as a function of power inductor current $I_{L\_AVG}$ to a "normal" range of gain values.

A further compensation for non-linearity may correct for non-linear effects to duty cycle signal D that may occur when flying capacitor voltage $V_{FLY}$ is overcharged. Such correction may be performed by summer 414, which adds a duty cycle compensation $D_{COMP}$ to a raw duty cycle signal D' generated by $I_L$ loop controller 406, to generate a compensated duty cycle signal D received by reference generator 410. Duty cycle compensation $D_{COMP}$ may be given by:

$$D_{COMP} = \alpha\left(\frac{2 V_{FLY}}{V_{IN}} - 1\right)$$

As duty cycle signal D approaches 0 or 1, either reference signal REF1 or REF2 may saturate. In such cases, it may be desirable to preserve duty cycle signal D (including the duty cycle compensation described above) and "sacrifice" $\alpha$. In other words, as duty cycle signal D approaches 0 or 1, reference generator 410 may continue to rely on duty cycle signal D to control reference signals REF1 and REF2, while fading out its reliance on offset signal $\alpha$ in the control of reference signals REF1 and REF2 when duty cycle signal D is within a predefined margin of 0 or 1. The following pseudocode describes an algorithm to take in account such saturation:

```
c₁ = (V_FLY/V_IN);
c₂ = 1/c₁;
c₃ = 1/(c₁ - 1);
D=D'+α*(2*c₁-2);
R1=D-α
R2=D+α
if REF1<0
    REF1_FF=0
    REF2_FF=D'*(-c₃)
else if REF2<0
    REF2_FF=0
    REF1_FF=D'*(c₂)
```

-continued

```
        else if REF1>1
            REF1_FF=1
            REF2_FF=c₃*(c₁-D')
        else if REF2>1
            REF2_FF=1
            REF1_FF=c₂*(D'-1)
```

Figure 2A:
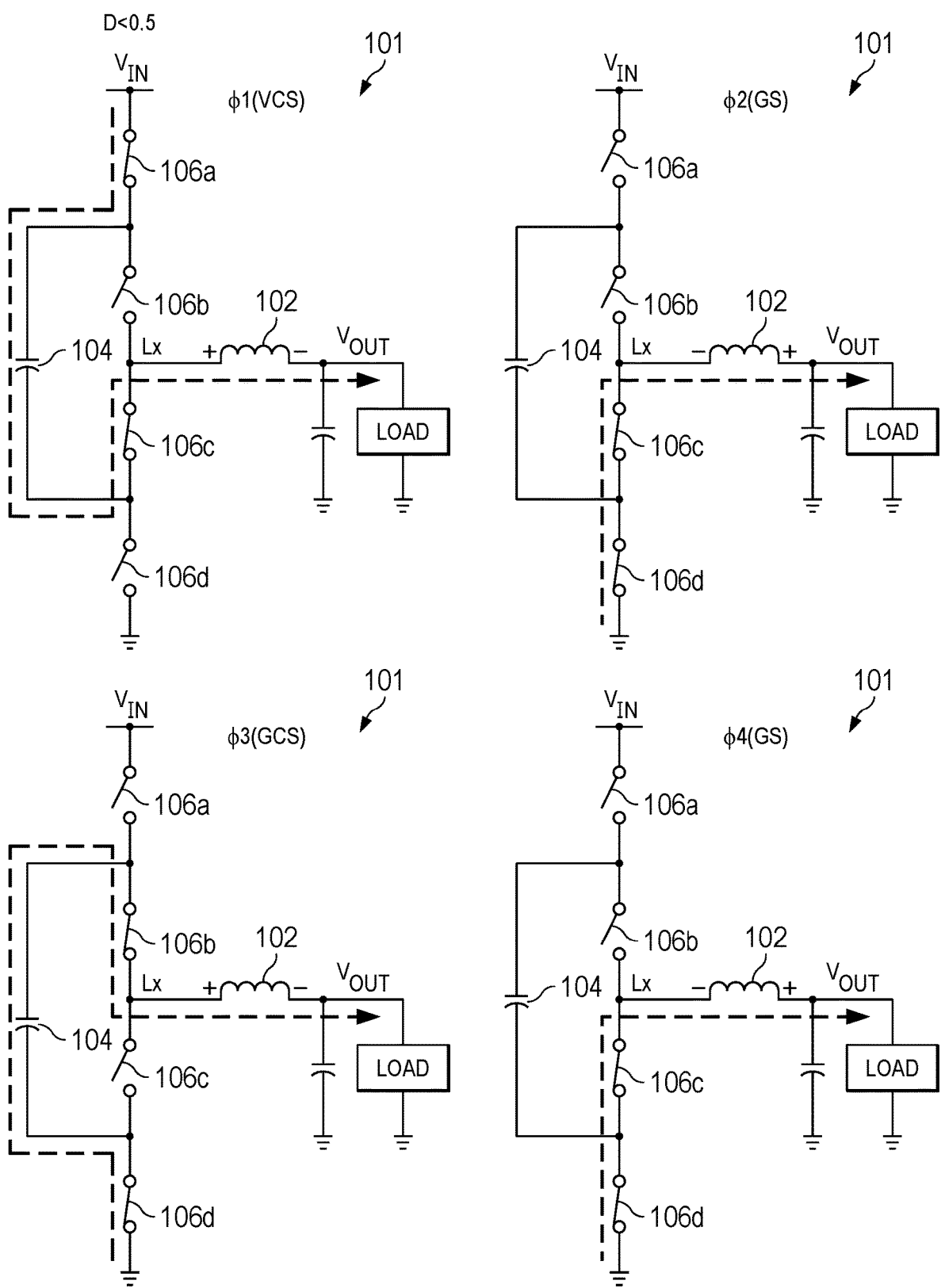
FIGS. 2A and 2B illustrate operation of the two-phase 3-level buck converter depicted in FIG. 1, as is known in the art.
Figure 2B:
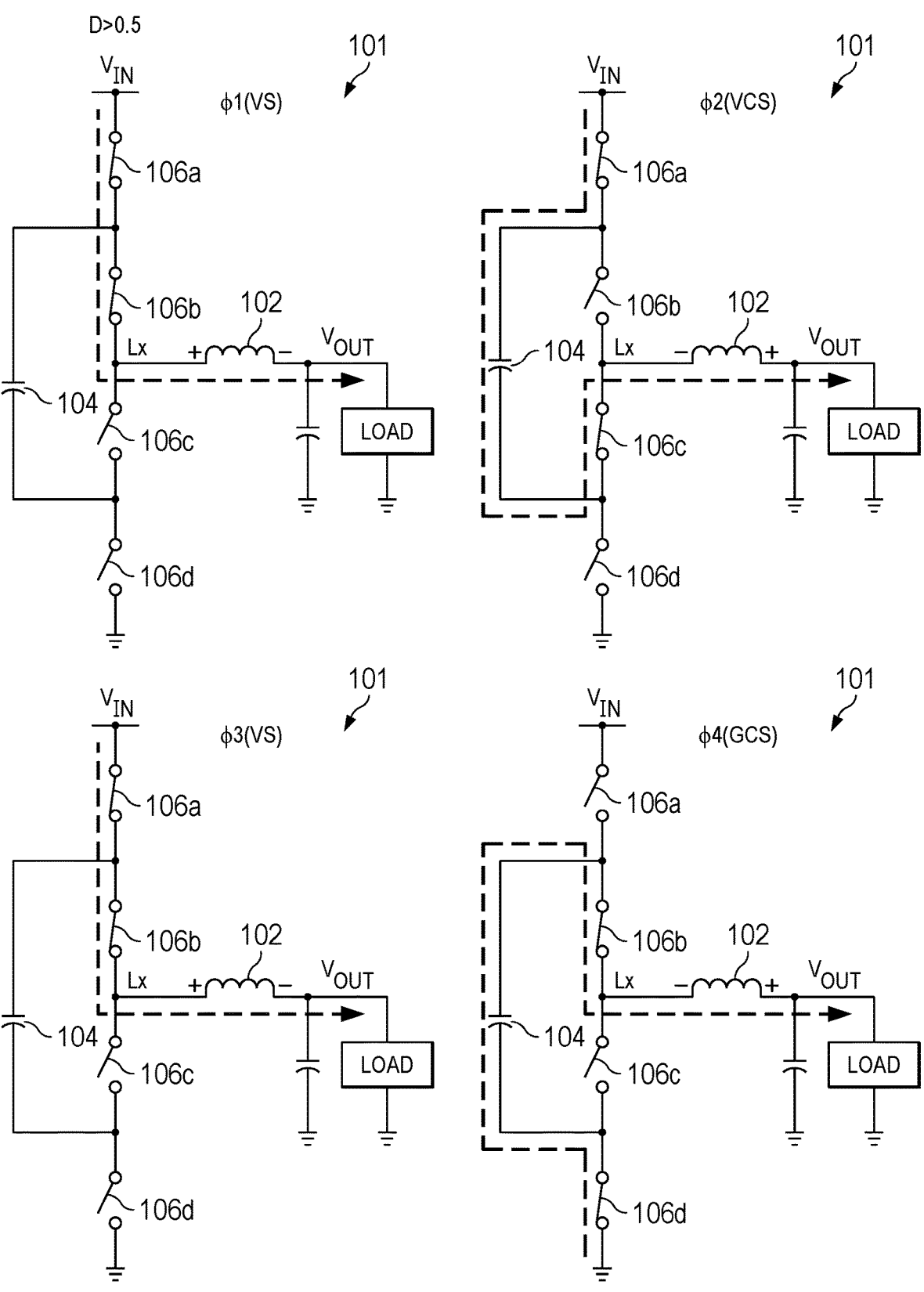

A further compensation for non-linearity may correct for non-linear effects resulting from using $V_{IN}/2$ as the reference signal for the flying capacitor voltage control loop when a ripple on input voltage $V_{IN}$ is large. Such correction may be performed by window averaging filter 412, as described below. As shown in FIGS. 2A and 2B, input voltage $V_{IN}$ may be coupled to power inductor 102 during the VS and VCS configurations. Thus, window averaging filter 412 may be configured to, based on switch control signal PWM1 and/or PWM2, average input voltage $V_{IN}$ (or average $V_{IN}/2$) during a window of time in which input voltage $V_{IN}$ is coupled to power inductor 102 and then output such windowed average as a modified reference signal $(V_{IN}/2)'$ to the flying capacitor voltage control loop. For example, in some embodiments, window averaging filter 412 may use switch control signal PWM1 to average during the full window in which input voltage $V_{IN}$ may be coupled to power inductor 102 (e.g., both the VS and VCS configurations). As another example, in other embodiments, window averaging filter 412 may use both switch control signals PWM1 and PWM2 to average during the VCS configuration. In these and other embodiments, window averaging filter 412 may include delay elements that delay received switch control signals PWM1 and PWM2 to properly match any delays present in inductor current and flying voltage controller 304.

The foregoing discussion contemplates the use of four approaches to compensating for non-linearities resulting from non-linear coupling between power inductor current $I_L$ and flying capacitor voltage $V_{FLY}$: alpha compensation in the flying capacitor voltage control loop (e.g., with summer 416 and alpha compensation $\alpha$), programmable gain correction and/or selective enablement of the loop controller of the flying capacitor voltage control loop based on average power inductor current (e.g., with programmable gain correction block 418), duty cycle compensation (including saturation) in the inductor current control loop (e.g., with summer 416 and duty cycle compensation $D_{COMP}$), and windowed averaging of the flying capacitor voltage control loop reference signal (e.g., with window averaging filter 412). It is understood that embodiments of the present disclosure may employ any one or more of these approaches in any suitable combination.

The foregoing description contemplates operation of system 300 in the buck mode. Operation of system 300 in a boost mode may be analogous to that described above with respect to the buck mode, but wherein magnetization of the power inductor is via the GS configuration and demagnetization of the power inductor is via the VS configuration.

In some embodiments, system 300 may be embodied in a program of computer-readable instructions and executed by a processing device, including without limitation a processor, application-specific integrated circuit, digital signal processor, or any other suitable processing device.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
   a multi-level power converter comprising a plurality of switches, a power inductor electrically coupled to the plurality of switches, and a flying capacitor coupled to the plurality of switches, wherein the plurality of switches are controllable among a plurality of switch configurations in order to generate an output voltage from an input voltage received by the multi-level power converter;

a flying capacitor voltage control loop configured t, based on an error signal between a measurement of a flying capacitor voltage across terminals of the flying capacitor and a flying capacitor reference voltage, generate switch control signals for switching among the plurality of switch configurations in order to regulate the flying capacitor voltage;

a power inductor current control loop configured to, based on a second error signal between a measurement of an inductor current flowing through the power inductor and a reference inductor current, generate switch control signals for switching among the plurality of switch configurations in order to regulate the inductor current; and a compensator configured to:

apply compensation to the flying capacitor reference voltage based on a measurement of the input voltage; and apply compensation to the power inductor current control loop based on a measurement of the flying capacitor.

2. The system of claim 1, wherein the compensation depends on a windowed average of the input voltage.

3. The system of claim 2, wherein a measurement window for the windowed average is based on one or more of the switch control signals.

4. The system of claim 2, wherein a measurement window for the windowed average is based on a switching frequency of the multi-level power converter.

5. A method comprising, in a multi-level power converter comprising a plurality of switches, a power inductor electrically coupled to the plurality of switches, and a flying capacitor coupled to the plurality of switches, wherein the plurality of switches are controllable among a plurality of switch configurations in order to generate an output voltage from an input voltage received by the multi-level power converter:

based on an error signal between a measurement of a flying capacitor voltage across terminals of the flying capacitor and a flying capacitor reference voltage, generating switch control signals for switching among the plurality of switch configurations in order to regulate the flying capacitor voltage;

based on a second error signal between a measurement of an inductor current flowing through the power inductor and a reference inductor current, generating switch control signals for switching among the plurality of switch configurations in order to regulate the inductor current; and applying compensation;

to the flying capacitor reference voltage based on a measurement of the input voltage; and to a power inductor current control loop based on a measurement of the flying capacitor.

6. The method of claim 5, wherein the compensation depends on a windowed average of the input voltage.

7. The method of claim 6, wherein a measurement window for the windowed average is based on one or more of the switch control signals.

8. The method of claim 6, wherein a measurement window for the windowed average is based on a switching frequency of the multi-level power converter.

* * * * *